US012598627B2

(12) United States Patent
Latheef et al.

(10) Patent No.: US 12,598,627 B2
(45) Date of Patent: Apr. 7, 2026

(54) METHOD AND SYSTEM FOR MANAGING CONFIGURATION AND CONTROL INFORMATION OF MBS SERVICES IN WIRELESS NETWORK

(71) Applicant: Samsung Electronics Co., Ltd., Suwon-si (KR)

(72) Inventors: Fasil Abdul Latheef, Bangalore (IN); Vinay Kumar Shrivastava, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 462 days.

(21) Appl. No.: 18/040,344

(22) PCT Filed: Aug. 3, 2021

(86) PCT No.: PCT/KR2021/010161
§ 371 (c)(1),
(2) Date: Feb. 2, 2023

(87) PCT Pub. No.: WO2022/030958
PCT Pub. Date: Feb. 10, 2022

(65) Prior Publication Data
US 2023/0362959 A1 Nov. 9, 2023

(30) Foreign Application Priority Data

Aug. 6, 2020 (IN) .............................. 202041033699
Jul. 30, 2021 (IN) .............................. 202041033699

(51) Int. Cl.
*H04W 72/30* (2023.01)
*H04W 72/1263* (2023.01)
*H04W 76/20* (2018.01)

(52) U.S. Cl.
CPC ....... *H04W 72/30* (2023.01); *H04W 72/1263* (2013.01); *H04W 76/20* (2018.02)

(58) Field of Classification Search
CPC .. H04W 72/30; H04W 76/20; H04W 72/1263
See application file for complete search history.

(56) References Cited

U.S. PATENT DOCUMENTS

2014/0086173 A1 3/2014 Sadeghi et al.
2016/0337817 A1 11/2016 Malladi et al.
(Continued)

FOREIGN PATENT DOCUMENTS

CN 108282749 A 7/2018
EP 3346640 A1 7/2018
(Continued)

OTHER PUBLICATIONS

Supplementary European Search Report dated Nov. 6, 2023, in connection with European Application No. 21852795.0, 11 pages.
(Continued)

*Primary Examiner* — Ajay Cattungal

(57) ABSTRACT

The present disclosure relates to a communication method and system for converging a 5$^{th}$-Generation (5G) communication system for supporting higher data rates beyond a 4$^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. Embodiments herein provide a method for managing control information of MBS services in a wireless network. The method includes broadcasting, by a BS (200) in the wireless network, a first message with scheduling information of a second message to a plurality of UEs (100A) in the wireless network. The method includes receiv-
(Continued)

ing, by a UE (100) in the plurality of UEs (100A), the first message. The method includes broadcasting, by the BS (200), the second message includes the control information of the MBS services to the plurality of UEs (100A) based on the scheduling information. The method includes receiving, by the UE (100), the second message based on the scheduling information in the first message. The method includes accessing, by the UE (100), the interested MBS service from the BS (200) using the control information in the second message.

16 Claims, 7 Drawing Sheets

(56)                References Cited

U.S. PATENT DOCUMENTS

| | | | |
|---|---|---|---|
| 2017/0366947 A1 | 12/2017 | Makhija et al. | |
| 2018/0192255 A1 | 7/2018 | Guo et al. | |
| 2018/0249481 A1 | 8/2018 | Xu et al. | |
| 2019/0223156 A1* | 7/2019 | Fujishiro | H04W 76/15 |
| 2019/0327582 A1 | 10/2019 | Lee et al. | |
| 2020/0084748 A1 | 3/2020 | Sadeghi et al. | |
| 2022/0046389 A1* | 2/2022 | Shrivastava | H04W 4/06 |
| 2023/0231692 A1* | 7/2023 | Baek | H04W 72/30 |
| | | | 370/329 |
| 2023/0232189 A1* | 7/2023 | Kim | H04W 36/0007 |
| | | | 370/312 |
| 2024/0414503 A1* | 12/2024 | Kim | H04L 1/1861 |

FOREIGN PATENT DOCUMENTS

| | | | |
|---|---|---|---|
| EP | 3484193 A1 | 5/2019 | |
| KR | 10-2020-0073118 A | 6/2020 | |
| WO | 2020043266 A1 | 3/2020 | |

OTHER PUBLICATIONS

Communication pursuant to Article 94(3) EPC dated May 17, 2024, in connection with European Patent Application No. 21852795.0, 6 pages.

Communication pursuant to Article 94(3) EPC dated Oct. 30, 2024, in connection with European Application No. 21852795.0, 6 pages.

International Search Report dated Nov. 10, 2021 in connection with International Patent Application No. PCT/KR2021/010161, 4 pages.

Written Opinion of the International Searching Authority dated Nov. 10, 2021 in connection with International Patent Application No. PCT/KR2021/010161, 4 pages.

Office Action dated Jun. 2, 2022 in connection with Indian Patent Application No. 202041033699, 6 pages.

Hearing Notice dated Apr. 22, 2025, in connection with Indian Application No. 202041033699, 3 pages.

The First Office Action dated Jul. 29, 2025, in connection with Chinese Application No. 202180057524.2, 12 pages.

Samsung, "NR MBS in Idle/Inactive mode," R2-2100451, 3GPP TSG-RAN WG2 Meeting #113-e, Online, Jan. 25-Feb. 5, 2021, 4 pages.

Notification of the Decision to Grant a Patent Right dated Feb. 2, 2026, in connection with Chinese Application No. 202180057524.2, 7 pages.

* cited by examiner

[Fig. 1]
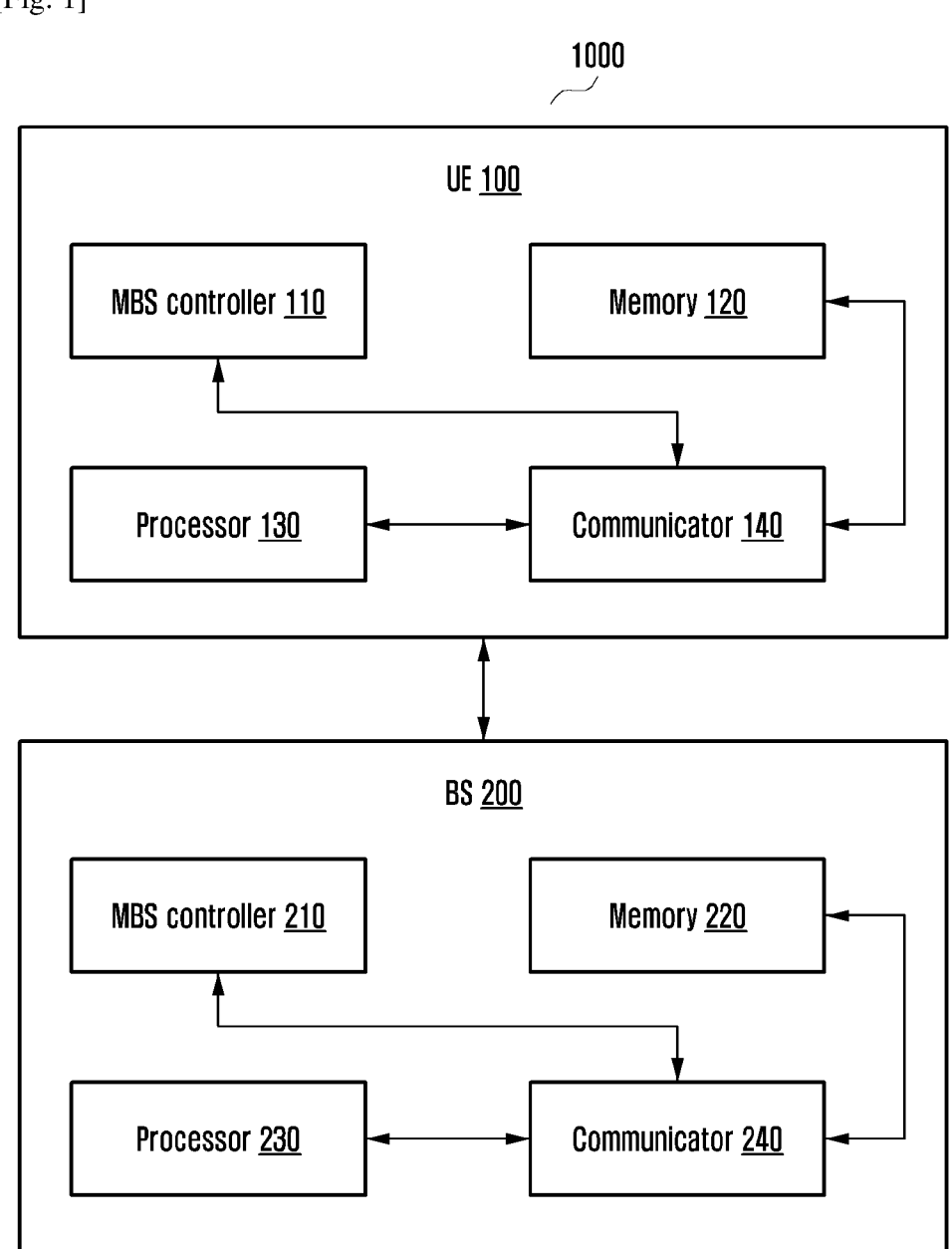

[Fig. 2]
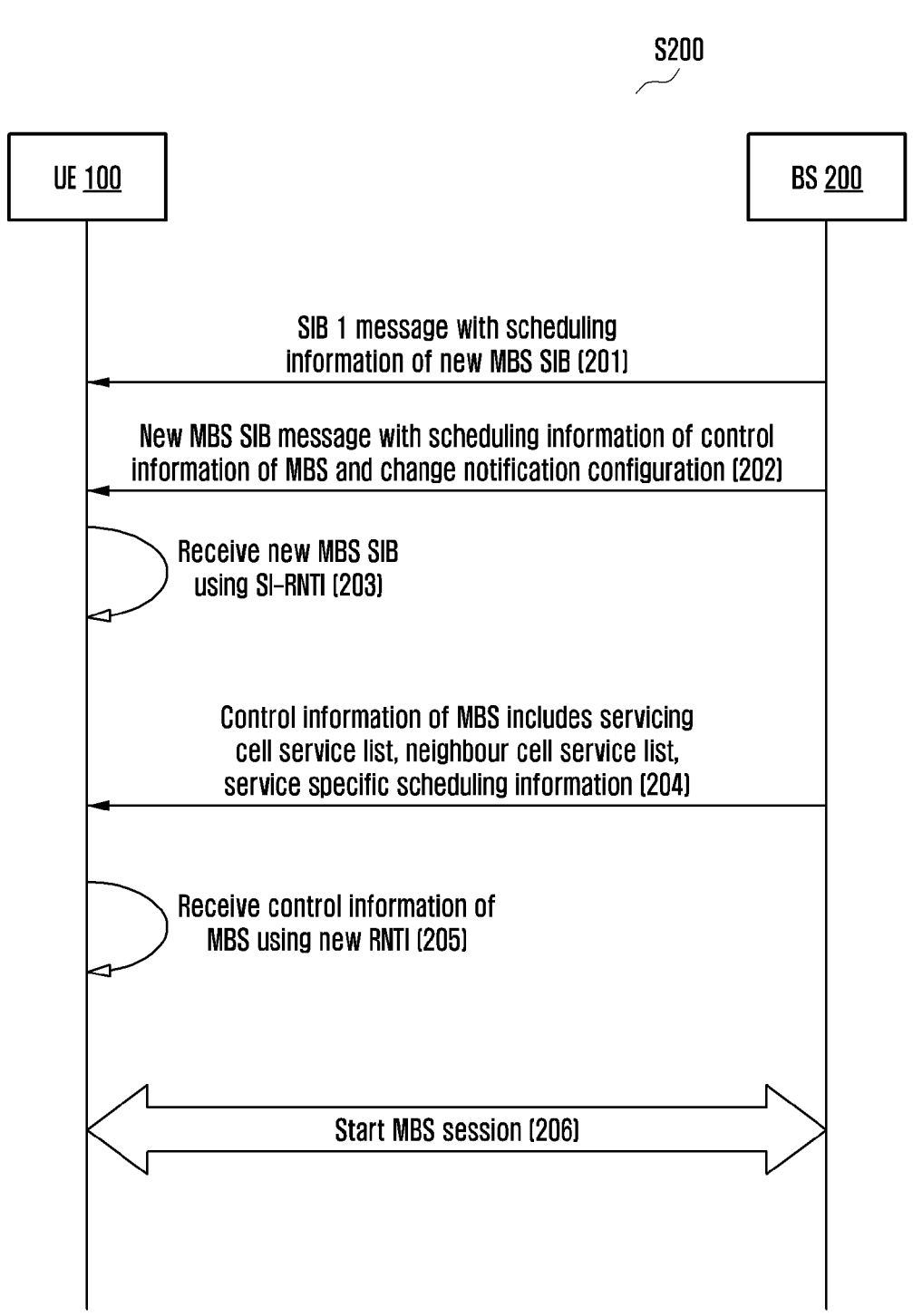

[Fig. 3]
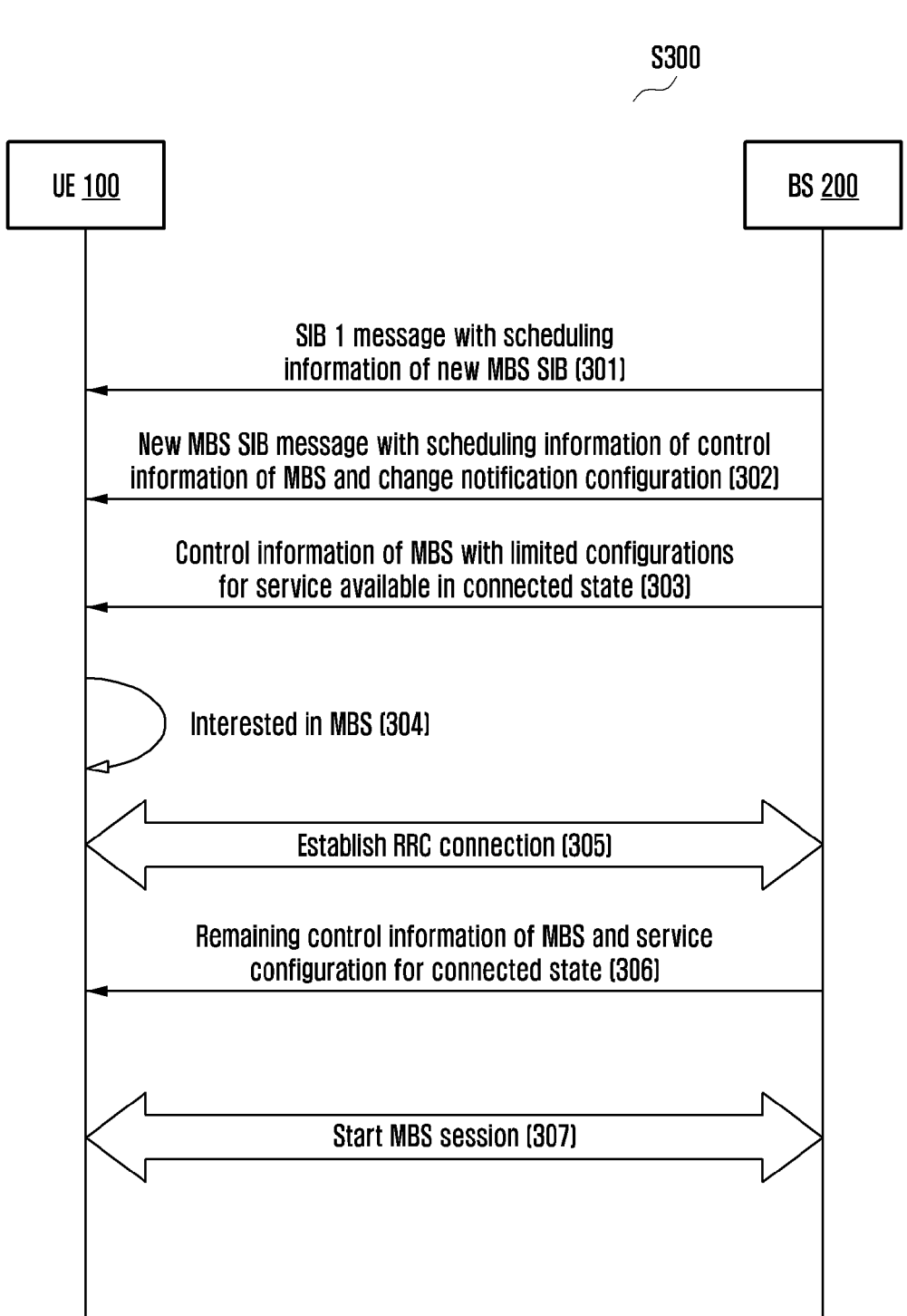

[Fig. 4]
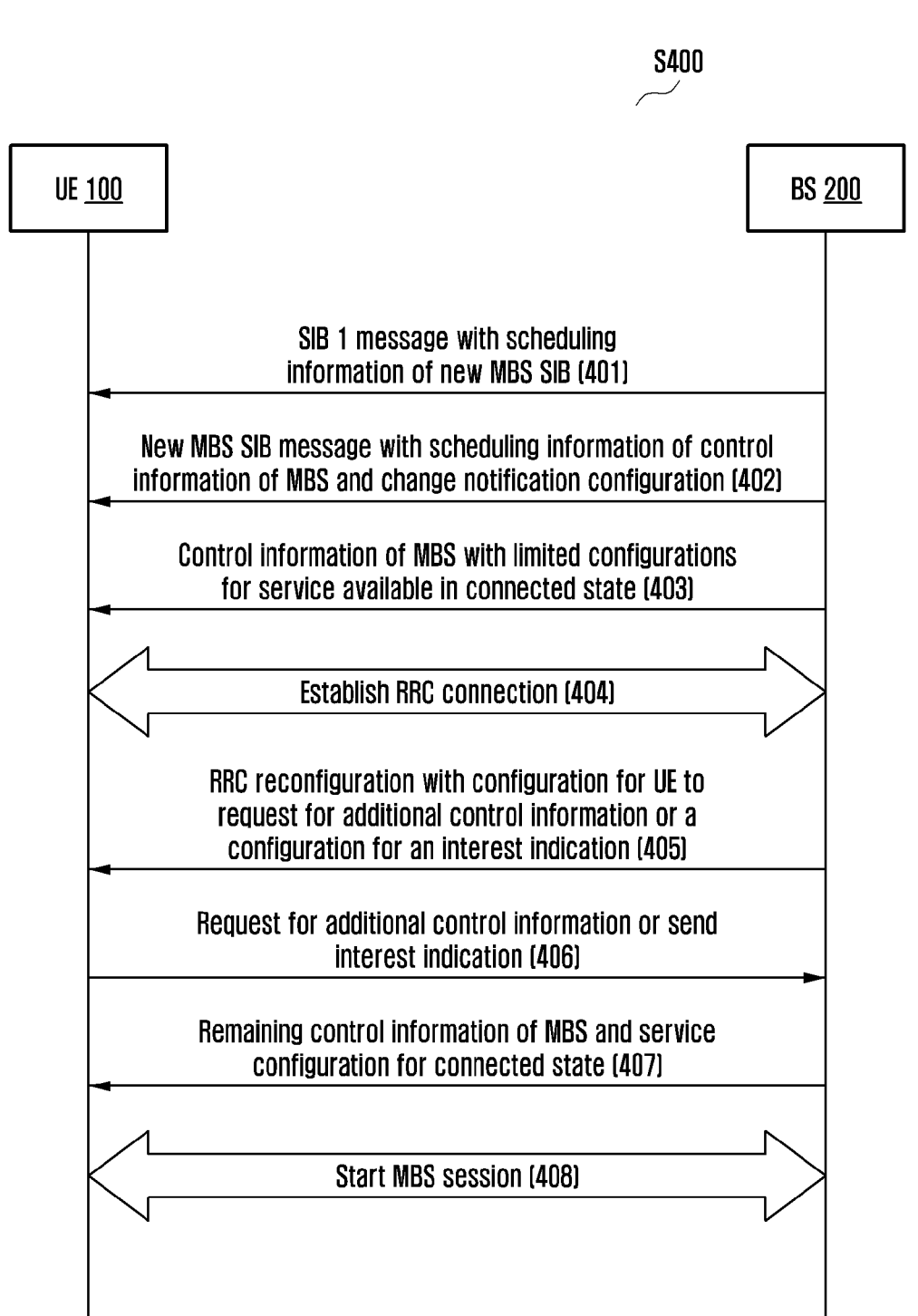

[Fig. 5]
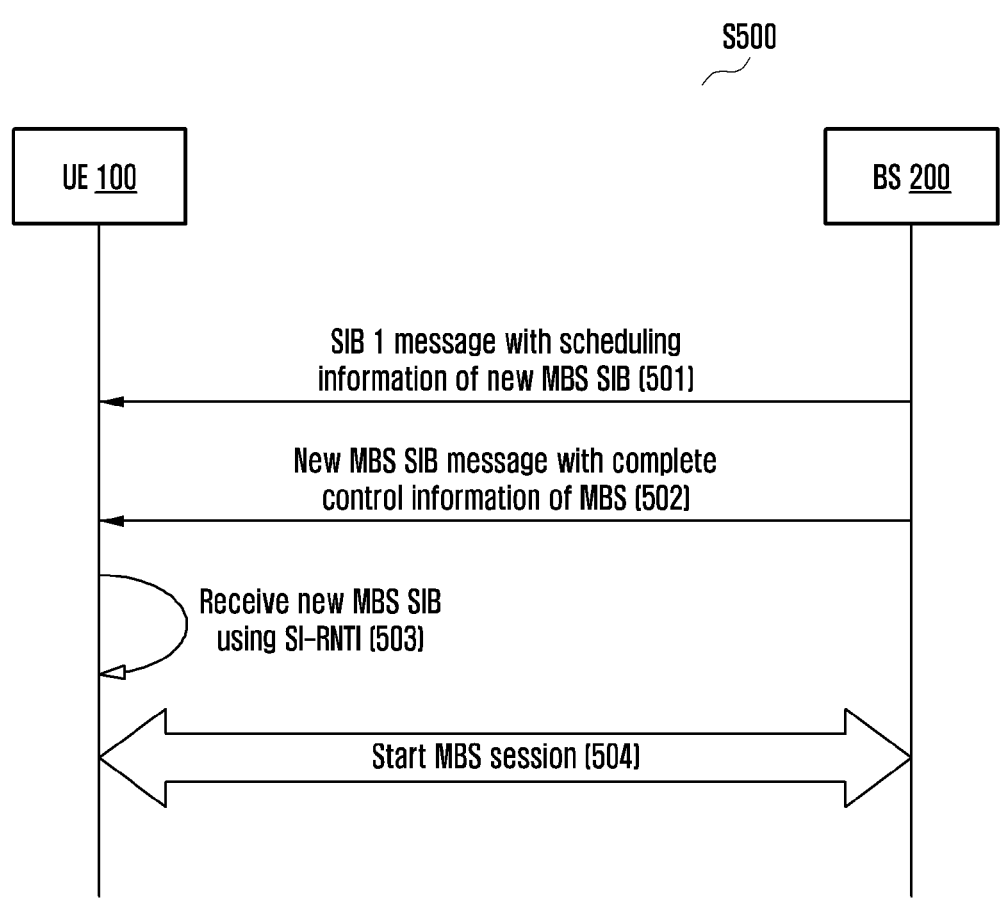

[Fig. 6]
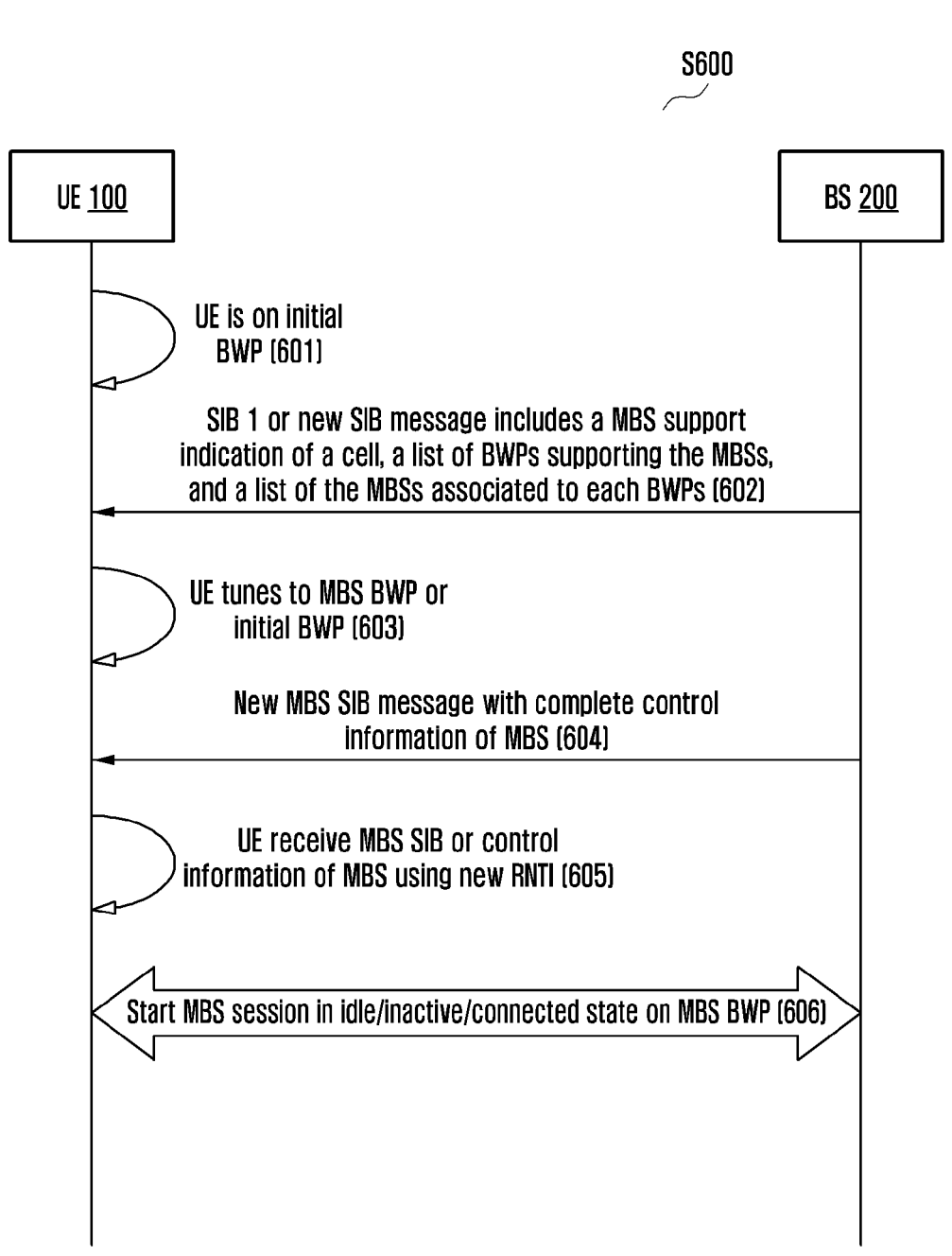

[Fig. 7]
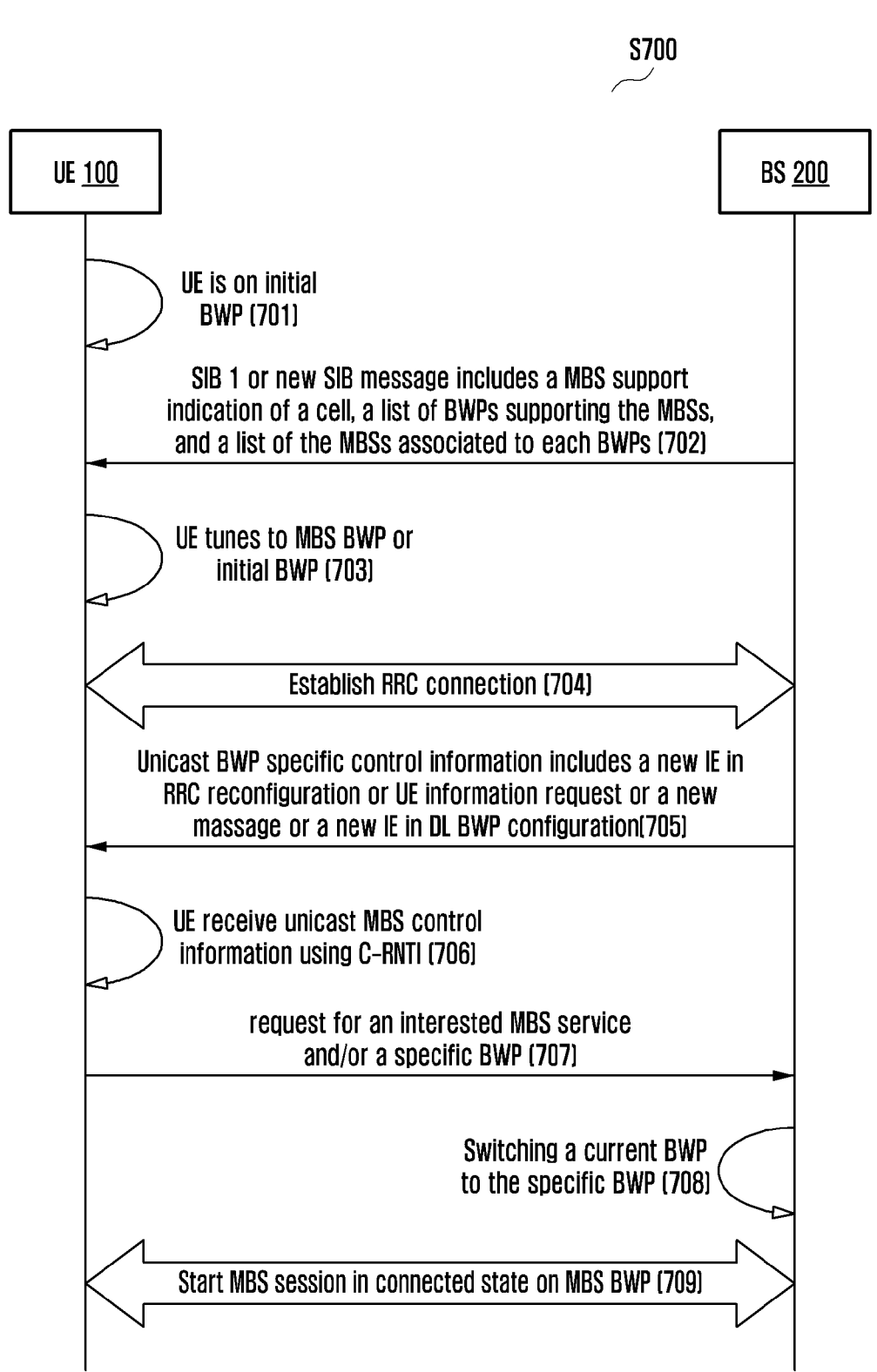

METHOD AND SYSTEM FOR MANAGING CONFIGURATION AND CONTROL INFORMATION OF MBS SERVICES IN WIRELESS NETWORK

CROSS-REFERENCE TO RELATED APPLICATIONS

This application is a 371 of International Application No. PCT/KR2021/010161 filed on Aug. 3, 2021, which claims priority to India Patent Application No. 202041033699 filed on Aug. 6, 2020, and India Patent Application No. 202041033699 filed on Jul. 30, 2021, the disclosures of which are herein incorporated by reference in their entirety.

BACKGROUND

1. Field

The present disclosure relates to wireless communication, and more specifically to a method and a system for managing configuration and control information of Multicast Broadcast Service (MBS) services in a wireless network.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beam-forming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Hierarchical signaling of information of Multimedia Broadcast Multicast Services (MBMS) for both Evolved Multimedia Broadcast Multicast Services (eMBMS) and Single-Cell Point-To-Multipoint (SC-PTM) has deployed in Long Term Evolution (LTE) wireless network. Terminal devices in the LTE wireless network communicates the information of the MBMS using a System Information Block (SIB) 13/20 message contain a Single Frequency Network (SFN) area information (only for eMBMS), and MBS Control Channel (MCCH) configuration. The MCCH configuration is further used by the terminal devices for resource allocation and sending/receiving a Physical Multicast Channel (PMCH) configuration for each MBMS service.

Similar to the MBMS, a Multicast and Broadcast Service (MBS) is being newly addressed for New Radio (NR) wireless network in a 3rd Generation Partnership Project (3GPP) Release 17. Since a Single Frequency Network (SFN) is not expected to be standardized in the NR wireless network, and therefore the SFN area information is not required in the NR wireless network. However, configurations related to service availability and schedules are required in deploying the MBS. Therefore, it is desired to specify signaling of control information related to the MBS.

The principal object of the embodiments herein is to provide a method and a system for managing configuration and control information of MBS services in a NR wireless network.

Another object of the embodiments herein is to control signaling such as hierarchical, mixed-mode, flat signaling for MBS service access in different Radio Resource Control (RRC) states and employ pertinent signaling and procedural operations.

Another object of the embodiments herein is to deliver MBS service related configuration that facilitate a UE's operation and access to the relevant MBS service Another object of the embodiments herein is to specify a new Radio Network Temporary Identifier (RNTI) for MCCH reception.

Another object of the embodiments herein is to specify a new Radio Network Temporary Identifier (RNTI) for MCCH change notification.

Another object of the embodiments herein is to specify a new SIB carrying frequency-service mapping which is also applicable in a non-MBS cell and ensure cell reselection and service continuity aspects for MBS.

SUMMARY

Accordingly, the embodiments herein provide a method for managing control information of MBS services in a wireless network. The method includes broadcasting, by a base station (B S) in the wireless network, a first message with scheduling information of a second message to a plurality of UEs in the wireless network. The method includes receiving, by a UE in the plurality of UEs, the first message. The method includes broadcasting, by the BS, the second message with configuration information of a third message to the plurality of UEs based on the scheduling information, where the third message includes the control information of the MBS services. The method includes receiving, by the UE, the second message based on the scheduling information in the first message. The method includes broadcasting, by the B S, the third message to the plurality of UEs. The method includes receiving, by the UE, the third message using the configuration information in the second message. The method includes accessing, by the UE, an interested MBS service from the B S using the control information in the third message.

In an embodiment, where the control information of the MBS services includes support of the MBS services on a cell, a list of services available in a current serving cell, a list of services that are available in both the serving cell and neighbor cells, a list of additional services that are available in specific neighbor cells, a configuration information for traffic channels (MTCHs), a configuration information for the MBS services supported in the current serving cell including a Group Radio Network Temporary Identifier (G-RNTI) for each service, and Discontinuous Reception (DRX) scheduling information for services, where the configuration information for the MBS services indicates a relevant Radio Resource Control (RRC) state(s) at which a specific MBS service can be accessed.

In an embodiment, where receiving, by the UE, the third message using the configuration information includes receiving, by the UE, the third message based on the configuration information and using a new RNTI (MBS-RNTI), where the new RNTI is used to decode a control (Physical Downlink Control Channel (PDCCH)) and/or data (Physical Downlink Shared Channel (PDSCH)) channel for MBS Control Channel (MCCH).

In another embodiment, where receiving by the UE, the MCCH change notification using a new RNTI (MCCH-NTF-RNTI), where the new RNTI is used to decode a control information (i.e. Downlink Control Information over the PDCCH) pertaining to a MCCH change notification message.

In another embodiment, where accessing, by the UE, the interested MBS service from the BS using the control information in the third message, includes establishing, by the UE, an RRC connection with the BS for accessing a specific set (i.e. first set) of MBS services allowed to access in an RRC connected state, sending, by the BS, a fourth message includes a service configuration includes additional MBS control information that allows the UE to access a remaining set (i.e. second set) of MBS services, sending, by the UE, the request for accessing the remaining set of MBS services to the BS based on the service configuration, and providing, by the B S, the remaining set of MBS services to the UE.

In another embodiment, where accessing, by the UE, the interested MBS service from the BS using the control information in the third message, includes establishing, by the UE, the RRC connection with the BS for accessing the specific set of MBS services allowed to access in the RRC connected state, sending, by the BS, an RRC reconfiguration includes a at least one of configuration for UE to request for additional MBS control information or a configuration for an interest indication to the UE, sending, by the UE, at least one of the interest indication or a request for the additional MBS control information to the BS, sending, by the BS, a fourth message includes a service configuration includes the additional MBS control information that allows the UE to access the remaining set of MBS services, sending, by the UE, a request using one of an RRC signaling or MAC signaling for accessing the remaining set of MBS services to the BS based on the service configuration, and providing, by the B S, the remaining set of MBS services to the UE.

In an embodiment, where the first message is a SIB1 message, and the scheduling information in the first message includes a scheduled time and a periodicity of a MBS SIB.

In an embodiment, where the second message is a new MBS SIB message, and the second message includes a change notification configuration that allows the UE to periodically check for a change in the MBS services.

In an embodiment, where the third message is a MCCH.

In an embodiment, where the UE requests to the BS for broadcasting at least one of the second message or the third message, where the BS undertakes transmission of relevant messages based on the request from the UE. That is, broadcast of the at least one of the second message or the third message is on demand from the UE.

In an embodiment, where broadcasting, by the BS, the third message to the UE includes unicasting, by the BS, the third message to the UE when the UE is in a connected state and/or the UE is not on the proper Bandwidth Part (BWP) or a carrier, so that the UE is not able to receive the broadcast of the third message.

Accordingly, the embodiments herein provide a method for managing the control information of the MBS services in the wireless network. The method includes broadcasting, by the BS in the wireless network, a first message with scheduling information of a second message to the plurality of UEs in the wireless network. The method includes receiving, by the UE in the plurality of UEs, the first message. The method includes broadcasting, by the BS, the second message includes the control information of the MBS services to the plurality of UEs based on the scheduling information. The method includes receiving, by the UE, the second message based on the scheduling information in the first message. The method includes accessing, by the UE, the interested MBS service from the BS using the control information in the second message.

Accordingly, the embodiments herein provide a method for managing the control information of the MBS services in the wireless network. The method includes broadcasting, by the BS in the wireless network, a first message includes a MBS service support indication of a cell, a list of BWPs supporting the MBS services, and a list of the MBS services associated to each BWPs to the plurality UEs in the wireless network. The method includes selecting, by the UE in the plurality of UEs, a BWP supporting the interested MBS service based on the first message. The method includes broadcasting, by the BS, a second message includes the control information of the MBS services to the plurality of UEs through the BWPs supporting the MBS services. The method includes accessing, by the UE, the interested MBS service from the BS through the selected BWP and using the control information.

In an embodiment, where selecting, by the UE, the BWP supporting the interested MBS service based on the first message, includes determining, by the UE, that a primary cell of the UE does not support the MBS services and a secondary cell of the UE supports the MBS services based on the MBS service support indication in the first message and establishing, by the UE, the RRC connection with the B S for receiving the control information of the MBS services, where the UE accesses the MBS services from the BS via the secondary cell.

In an embodiment, where selecting the BWP supporting the interested MBS service based on the first message, includes determining, by the UE, whether an initial BWP is equal or larger than a BWP required for accessing the MBS services, and performing one of selecting the BWP from the list of BWPs equal or larger than the BWP required for accessing the MBS services, when the initial BWP is not equal or larger than the BWP required for accessing the MBS services, and selecting the initial BWP for accessing the MBS services, when the initial BWP is equal or larger than the BWP required for accessing the MBS services.

In an embodiment, where the method includes receiving, by the UE, the second message through the selected BWP using the new RNTI, in response to broadcasting the second message by the B S.

Accordingly, the embodiments herein provide a method for managing the control information of the MBS services in the wireless network. The method includes broadcasting, by the BS in the wireless network, a first message includes the MBS service support indication of the cell, the list of BWPs supporting the MBS services, and the list of the MBS services associated with each BWPs to the plurality of UEs in the wireless network. The method includes selecting, by the UE in the plurality of UEs, the BWP supporting the interested MBS service based on the first message. The method includes establishing, by the UE, the RRC connection with the B S. The method includes unicasting, by the BS, control information of the MBS services to the UE. The method includes receiving, by the UE, the control information of the MBS services using a Cell RNTI (C-RNTI). The method includes sending, by the UE, a request for the interested MBS service and a specific BWP in the selected BWP. The method includes switching, by the BS, a current BWP of the UE to the specific BWP, in response to receiving the request from the UE. The method includes accessing, by the UE, the interested MBS service from the B S through the specific BWP and using the control information.

In an embodiment, where establishing, by the UE, the RRC connection with the BS, includes determining, by the UE, that the primary cell of the UE does not support the MBS services and the secondary cell of the UE supports the MBS services based on the MBS service support indication in the first message and establishing, by the UE, the RRC connection with the BS for receiving the control information of the MBS services, where the UE accesses the MBS services from the B S via the secondary cell.

In an embodiment, where the B S switches between unicast signaling of the control information and broadcast signaling of the control information based on a number of UE is available to receive the control information.

Accordingly, the embodiments herein provide a system for managing the control information of the MBS services in the wireless network. The system including the UE and the B S, where the UE and the BS comprise MBS controllers. The MBS controller of the B S is configured to broadcast the first message with scheduling information of the second message to the plurality of UEs in the wireless network. The MBS controller of the BS is configured to broadcast the second message with the configuration information of the third message to the plurality of UEs based on the scheduling information, where the third message includes control information of the MBS services. The MBS controller of the B S is configured to broadcast the third message to the plurality of UEs. The MBS controller of the UE is configured to receive the first message. The MBS controller of the UE is configured to receive the second message based on the scheduling information in the first message. The MBS controller of the UE is configured to receive the third message using the configuration information in the second message. The MBS controller of the UE is configured to access the interested MBS service from the B S using the control information in the third message.

Accordingly, the embodiments herein provide the system for managing the control information of the MBS services in the wireless network. The system including the UE and the B S, where the UE and the BS comprise the MBS controllers. The MBS controller of the B S is configured to broadcast the first message with scheduling information of the second message to the plurality of UEs in the wireless network. The MBS controller of the B S is configured to broadcast the second message includes the control information of the MBS services to the plurality of UEs based on the scheduling information. The MBS controller of the UE is configured to receive the first message. The MBS controller of the UE is configured to receive the second message based on the scheduling information in the first message. The MBS controller of the UE is configured to access the interested MBS service from the BS using the control information in the second message.

Accordingly, the embodiments herein provide the system for managing the control information of the MBS services in the wireless network. The system including the UE and the B S, where the UE and the BS comprise the MBS controllers. The MBS controller of the B S is configured to broadcast the first message includes the MBS service support indication of the cell, the list of BWPs supporting the MBS services, and the list of the MBS services associated to each BWPs to the plurality of UEs in the wireless network. The MBS controller of the B S is configured to broadcast the second message includes the control information of the MBS services to the plurality of UEs through the BWPs supporting the MBS services. The MBS controller of the UE is configured to select the BWP supporting the interested MBS service based on the first message. The MBS controller of the UE is configured to access the interested MBS service from the BS through the selected BWP and using the control information in the second message.

Accordingly, the embodiments herein provide the system for managing the control information of the MBS services in the wireless network. The system including the UE and the B S, where the UE and the BS comprise the MBS controllers. The MBS controller of the BS is configured to broadcast the first message includes the MBS service support indication of the cell, the list of BWPs supporting the MBS services, and the list of the MBS services associated to each BWPs to the plurality of UEs in the wireless network. The MBS controller of the BS is configured to unicast the control information of the MBS services to the UE, in response to establishing the RRC connection by the UE. The MBS controller of the BS is configured to switch the current BWP of the UE to the specific BWP, in response to receiving the request from the UE. The MBS controller of the UE is configured to select the BWP supporting the interested MBS service based on the first message. The MBS controller of the UE is configured to establish the RRC connection with the BS. The MBS controller of the UE is configured to receive the control information of the MBS services from the BS using the C-RNTI. The MBS controller of the UE is configured to send the request for the interested MBS service and the specific BWP in the selected BWP. The MBS controller of the UE is configured to access the interested MBS service from the BS through the specific BWP and using the control information, in response to switching the current BWP of the UE to the specific BWP.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments, and the embodiments herein include all such modifications.

According to an embodiments of present disclosure a method and a system for managing configuration and control information of MBS services in a NR wireless network is provided.

BRIEF DESCRIPTION OF THE DRAWINGS

This disclosure is illustrated in the accompanying drawings, throughout which like reference letters indicate corresponding parts in the various figures. The embodiments herein will be better understood from the following description with reference to the drawings, in which:

FIG. 1 is a block diagram of a system for managing control information of MBS services in a wireless network, according to an embodiment as disclosed herein.

FIG. 2 is a sequential diagram illustrating signaling of the control information of the MBS services between a UE and a BS, according to the embodiments as disclosed herein;

FIG. 3 is a sequential diagram illustrating a mixed mode transmission of signaling of the control information of the MBS services between the UE and the BS, according to the embodiments as disclosed herein;

FIG. 4 is a sequential diagram illustrating the mixed mode transmission of signaling of the control information of a specific set of MBS services and a remaining set of MBS services between the UE and the B S, according to the embodiments as disclosed herein;

FIG. 5 is a sequential diagram illustrating a broadcast transmission of signaling of the control information of the MBS services between the UE and the BS, according to the embodiments as disclosed herein;

FIG. 6 is a sequential diagram illustrating the broadcast transmission of signaling of the control information of the MBS services between the UE and the BS for sub-cell level support of MBS, according to the embodiments as disclosed herein; and FIG. 7 is a sequential diagram illustrating the mixed mode transmission of signaling of the control information of the MBS services between the UE and the BS for sub-cell level support of the MBS or Secondary Cell (SCell) support of the MBS, according to the embodiments as disclosed herein.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, the embodiments herein provide a method for managing control information of MBS services in a wireless network. The method includes broadcasting, by a BS in the wireless network, a first message with scheduling information of a second message to a plurality of UEs in the wireless network. The method includes receiving, by a UE in the plurality of UEs, the first message. The method includes broadcasting, by the BS, the second message with a configuration information of a third message to the plurality of UEs based on the scheduling information, where the third message includes the control information of the MBS services. The method includes receiving, by the UE, the second message based on the scheduling information in the first message. The method includes broadcasting, by the B S, the third message to the plurality of UEs. The method includes receiving, by the UE, the third message using the configuration information in the second message. The method includes accessing, by the UE, an interested MBS service from the B S using the control information in the third message.

Accordingly, the embodiments herein provide a method for managing the control information of the MBS services in the wireless network. The method includes broadcasting, by the BS in the wireless network, a first message with scheduling information of a second message to the plurality of UEs in the wireless network. The method includes receiving, by the UE in the plurality of UEs, the first message. The method includes broadcasting, by the BS, the second message includes the control information of the MBS services to the plurality of UEs based on the scheduling information. The method includes receiving, by the UE, the second message based on the scheduling information in the first message. The method includes accessing, by the UE, the interested MBS service from the B S using the control information in the second message.

Accordingly, the embodiments herein provide a method for managing the control information of the MBS services in the wireless network. The method includes broadcasting, by the BS in the wireless network, a first message includes a MBS service support indication of a cell, a list of Band Width Parts (BWPs) supporting the MBS services, and a list of the MBS services associated to each BWPs to the plurality UEs in the wireless network. The method includes selecting, by the UE in the plurality of UEs, a BWP supporting the interested MBS service based on the first message. The method includes broadcasting, by the B S, a second message includes the control information of the MBS services to the plurality of UEs through the BWPs supporting the MBS services. The method includes accessing, by the UE, the interested MBS service from the BS through the selected BWP and using the control information.

Accordingly, the embodiments herein provide a method for managing the control information of the MBS services in the wireless network. The method includes broadcasting, by the BS in the wireless network, a first message includes the MBS service support indication of the cell, the list of BWPs supporting the MBS services, and the list of the MBS services associated to each BWPs to the plurality of UEs in the wireless network. The method includes selecting, by the UE in the plurality of UEs, the BWP supporting the interested MBS service based on the first message. The method includes establishing, by the UE, an RRC connection with the BS. The method includes unicasting, by the BS, control information of the MBS services to the UE. The method includes receiving, by the UE, the control information of the MBS services using a Cell RNTI (C-RNTI). The method includes sending, by the UE, a request for the interested MBS service and a specific BWP in the selected BWP. The method includes switching, by the BS, a current BWP of the UE to the specific BWP, in response to receiving the request from the UE. The method includes accessing, by the UE, the interested MBS service from the BS through the specific BWP and using the control information.

Accordingly, the embodiments herein provide a system for managing the control information of the MBS services in the wireless network. The system including the UE and the B S, where the UE and the BS comprise MBS controllers. The MBS controller of the BS is configured to broadcast the first message with scheduling information of the second message to the plurality of UEs in the wireless network. The MBS controller of the BS is configured to broadcast the second message with the configuration information of the third message to the plurality of UEs based on the scheduling information, where the third message includes the control information of the MBS services. The MBS controller of the BS is configured to broadcast the third message to the plurality of UEs. The MBS controller of the UE is configured to receive the first message. The MBS controller of the UE is configured to receive the second message based on the scheduling information in the first message. The MBS controller of the UE is configured to receive the third message using the configuration information in the second message. The MBS controller of the UE is configured to access the interested MBS service from the BS using the control information in the third message.

Accordingly, the embodiments herein provide a system for managing the control information of the MBS services in the wireless network. The system including the UE and the B S, where the UE and the B S comprise the MBS controllers. The MBS controller of the B S is configured to broadcast the first message with scheduling information of the second message to the plurality of UEs in the wireless network. The MBS controller of the BS is configured to broadcast the second message includes the control information of the MBS services to the plurality of UEs based on the scheduling information. The MBS controller of the UE is configured to receive the first message. The MBS controller of the UE is configured to receive the second message based on the scheduling information in the first message. The MBS controller of the UE is configured to access the interested MBS service from the BS using the control information in the second message.

Accordingly, the embodiments herein provide a system for managing the control information of the MBS services in the wireless network. The system including the UE and the B S, where the UE and the B S comprise the MBS controllers. The MBS controller of the B S is configured to broadcast the first message includes the MBS service support indication of the cell, the list of BWPs supporting the MBS services, and the list of the MBS services associated to each BWPs to the plurality of UEs in the wireless network. The MBS controller of the BS is configured to broadcast the second message includes the control information of the MBS services to the plurality of UEs through the BWPs supporting the MBS services. The MBS controller of the UE is configured to select the BWP supporting the interested MBS service based on the first message. The MBS controller of the UE is configured to access the interested MBS service from the BS through the selected BWP and using the control information in the second message.

Accordingly, the embodiments herein provide a system for managing the control information of the MBS services in the wireless network. The system including the UE and the B S, where the UE and the B S comprise the MBS controllers. The MBS controller of the BS is configured to broadcast the first message includes the MBS service support indication of the cell, the list of BWPs supporting the MBS services, and the list of the MBS services associated with each BWPs to the plurality of UEs in the wireless network. The MBS controller of the BS is configured to unicast the control information of the MBS services to the UE, in response to establishing the RRC connection by the UE. The MBS controller of the BS is configured to switch the current BWP of the UE to the specific BWP, in response to receiving the request from the UE. The MBS controller of the UE is configured to select the BWP supporting the interested MBS service based on the first message. The MBS controller of the UE is configured to establish the RRC connection with the BS. The MBS controller of the UE is configured to receive the control information of the MBS services from the BS using the C-RNTI. The MBS controller of the UE is configured to send the request for the interested MBS service and the specific BWP in the selected BWP. The MBS controller of the UE is configured to access the interested MBS service from the BS through the specific BWP and using the control information, in response to switching the current BWP of the UE to the specific BWP.

Unlike existing methods and systems, the NR (New Radio) has certain specific requirements and different system configurations e.g. usage bandwidth parts, sub-carrier spacing, beamforming, new frame structure etc. that requires a new design and approach in order to support MBS services over NR. For example, the UE needs to be on proper BWP or informs network for switching to proper BWP and/or reconfiguration to appropriate delivery modes in order to receive the MBS services. Further, certain MBS services for 5G require high reliability and low latency (e.g. mission critical delay-sensitive signaling require a packet delay budget of 60 ms and packet error rate of 10-6). Fulfilling these requirements need new approaches and services provisioning in specific RRC states e.g. only Connected mode can facilitate feedback and retransmission approaches.

Referring now to the drawings, and more particularly to FIGS. 1 through 7, there are shown preferred embodiments.

FIG. 1 is a block diagram of a system for managing control information of MBS services in a wireless network, according to an embodiment as disclosed herein. An example of the wireless network is a cellular network (e.g. Fifth Generation New Radio (5G NR) cellular network, 4G LTE, 6G). The wireless network is formed by connecting by a plurality of UEs (100A) to a base station (BS) (200). In an embodiment, the proposed system includes the plurality of UEs (100A) and the BS (200). Examples of the plurality of UEs (100A) includes, but not limited to a terminal, a smart phone, a tablet computer, a personal digital assistance (PDA), a desktop computer, an Internet of Things (IoT), a wearable device, a television, a vehicle with communication facility etc.

An example of the BS (200) is a gNodeB (gNB). In an embodiment, each UE (100) in the plurality of UEs (100A) includes a MBS controller (110), a memory (120), a processor (130), and a communicator (140). The MBS controller (110) can be defined as a controller. The controller performs an operation of the UE described a plurality of embodiment of the disclosure. The communicator (140) can be defined as a transceiver. In an embodiment, the BS (200) includes a MBS controller (210), a memory (220), a processor (230), and a communicator (240). The MBS controller (220) can be defined as a controller. The controller performs an operation of the BS described a plurality of embodiment of the disclosure. The communicator (240) can be defined as a transceiver. The MBS controller (110, 220) is implemented by processing circuitry such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like.

In an embodiment, the MBS controller (210) broadcasts a first message with scheduling information of a second message to the plurality of UEs (100A). In an embodiment, the first message is a SIB1 message, and the scheduling information in the first message includes a scheduled time and/or a periodicity of a MBS SIB (i.e. second message). In an embodiment, the second message is a new MBS SIB message, and the second message includes a change notification configuration that allows the UE (100) to periodically check for a change in the MBS services. Further, the MBS controller (110) receives the first message. Further, the MBS controller (210) broadcasts the second message with a configuration information of a third message to the plurality of UEs (100A) based on the scheduling information, where the third message includes the control information of the MBS services.

In an embodiment, the third message is a MCCH. In an embodiment, the control information of the MBS services includes at least one of a support of the MBS services on a cell, a list of services that the UE (100) has requested, associated configurations such as a bearer configuration, a channel configuration, a protocol layers configuration, a list of services available in a current serving cell, a list of services that are available in both the serving cell and neighbor cells, a list of additional services that are available in specific neighbor cells, a configuration information for traffic channels (MTCHs), a configuration information for the MBS services supported in the current serving cell including a Group Radio Network Temporary Identifier (G-RNTI) for each service, or Discontinuous Reception (DRX) scheduling information for services, where the configuration information for the MBS services indicates a relevant Radio Resource Control (RRC) states(s) at which specific MBS services can be accessed. Neighbor cell information includes a Physical Cell Identity (PCID), a frequency or carrier, MBS services supported either as a list or a bitmap where a bit represents a neighbor cell. For example, an 8 bit bitmap will have 8 neighboring cells and can be indicated against each MBS service to show its availability for the neighbor cells. Another representation can be for each, say 8 neighbor cells, MBS services presence or absence on each of them are indicated.

The MBS controller (110) receives the second message based on the scheduling information in the first message. Further, the MBS controller (210) broadcasts the third message to the plurality of UEs (100A). In an embodiment, the MBS controller (110) sends a request to the BS (200) for broadcasting the second message and the third message, where the BS (200) further undertakes transmission of the relevant messages based on the request from the UE (100). In an embodiment, the MBS controller (210) unicasts the third message to the UE (100) when the UE (100) is in a connected state. The MBS controller (110) receives the third message using the configuration information in the second message. In an embodiment, the MBS controller (110) receives the third message based on the configuration information and using a new RNTI (MBS-RNTI), where the new RNTI is used to decode a control (Physical Downlink Control Channel (PDCCH)) and/or data (Physical Downlink Shared Channel (PDSCH)) channel for MBS Control Channel (MCCH). Further, the MBS controller (110) accesses an interested MBS service from the BS (200) using the control information in the third message.

In another embodiment, the MBS controller (110) establishes an RRC connection with the BS (200) for accessing a specific set (i.e. first set) of MBS services allowed to access in an RRC connected state, in response to receiving the third message. Further, the MBS controller (110) detects an interest for accessing a remaining set (i.e. second set) of MBS services. Further, the MBS controller (210) sends a fourth message includes a service configuration includes additional MBS control information that allows the UE (100) to access a remaining set (i.e. second set) of MBS services. Further, the MBS controller (110) sends the request for accessing the remaining set of MBS services to the BS (200) based on the service configuration. Further, the MBS controller (210) providing the remaining set of MBS services to the UE (100).

In another embodiment, the MBS controller (110) establishes the RRC connection with the BS (200) for accessing the specific set of MBS services allowed to access in the RRC connected state, in response to receiving the third message. Further, the MBS controller (210) sends an RRC reconfiguration includes a configuration for UE (100) to request for additional MBS control information and/or a configuration for an interest indication to the UE (100). Further, the MBS controller (110) sends an interest indication or a request for the additional MBS control information to the BS (200). The interest indication is sent by the UE (100) to the BS (200) as an UE assistance information message or a new RRC message for the MBS interest indication. Configuration provided by BS (200) to UE (100) includes at least one of the triggers, periodic timer, prohibit timer for sending of UE assistance information message or MBS interest indication. Further, the MBS controller (210) sends the fourth message includes the service configuration includes the additional MBS control information that allows the UE (100) to access the remaining set of MBS services. Further, the MBS controller (110) sends a request using at least one of an RRC signaling or MAC signaling for accessing the remaining set of MBS services to the BS (200) based on the service configuration. Further, the MBS controller (210) provides the remaining set of MBS services to the UE (100).

In another embodiment, the MBS controller (210) broadcasts the first message with scheduling information of the second message to the plurality of UEs (100A). Further, the MBS controller (110) receives the first message. Further, the MBS controller (210) broadcasts the second message to the plurality of UEs (100A) based on the scheduling information, where the second message includes the control information of the MBS services in another embodiment. Further, the MBS controller (110) receives the second message based on the scheduling information in the first message. Further, the MBS controller (110) accesses the interested MBS service from the BS (200) using the control information in the second message.

In another embodiment, the MBS controller (210) broadcasts the first message to the plurality of UEs (100A). In another embodiment, the first message is the SIB1 message or the new MBS SIB message and the first message includes a MBS service support indication of a cell, a list of Band Width Parts (BWPs) supporting the MBS services, and a list of the MBS services associated to each BWPs. The MBS controller (110) selects BWPs supporting the interested MBS service based on the first message. In an embodiment, the MBS controller (110) determines whether an initial BWP is equal or larger than a BWP required for accessing the MBS services. The MBS controller (110) selects the BWP from the list of BWPs equal or larger than the BWP required for accessing the MBS services when the initial BWP is not equal or larger than the BWP required for accessing the MBS services.

The MBS controller (110) selects the initial BWP for accessing the MBS services when the initial BWP is equal or larger than the BWP required for accessing the MBS services. Further, the MBS controller (210) broadcasts the second message includes the control information of the MBS services to the plurality of UEs (100A) through the BWPs supporting the MBS services. Further, the MBS controller (110) accesses the interested MBS service from the BS (200) through the selected BWPs and using the control information. In an embodiment, the MBS controller (110) receives the second message from the BS (200) through the selected BWPs using the new RNTI (MBS-RNTI).

In another embodiment, the MBS controller (210) broadcasts a first message that includes the MBS service support indication of the cell, the list of BWPs supporting the MBS services, and the list of the MBS services associated with each BWPs to a plurality of UEs (100A). Further, the MBS controller (110) selects the BWPs supporting the interested MBS service based on the first message. Further, the MBS controller (110) establishes the RRC connection with the BS (200). Further, the MBS controller (210) unicasts the control information of the MBS services to the UE (100). Further, the MBS controller (110) receives the control information of the MBS services using a Cell RNTI (C-RNTI). Further, the MBS controller (110) sends a request for an interested MBS service and/or a specific BWP in the selected BWPs. Further, the MBS controller (210) switches a current BWP of the UE (100) to the specific BWP, in response to receiving the request from the UE (100). Further, the MBS controller (110) accesses the interested MBS service from the BS (200) through the specific BWP and using the control information.

In another embodiment, the MBS controller (110) determines that a primary cell (PCell) of the UE (100) does not support the MBS services and a secondary cell (SCell) of the UE (100) supports the MBS services based on the MBS service support indication in the first message. Further, the MBS controller (110) establishes an RRC connection with the BS (200) for receiving the control information of the MBS services, where the UE (100) accesses the MBS services from the BS (200) via the secondary cell.

In another embodiment, the MBS controller (210) switches between unicast signaling of the control information and broadcast signaling of the control information based on a number of UE (100) available to receive the control information.

In another embodiment, the MBS controller (110) detects that the UE (100) is in the connected state or using an incorrect BWP/carrier. Further, the MBS controller (110) indicates that the UE (100) is in the connected state or using the incorrect BWP/carrier to the BS (200). Further, the MBS controller (210) receives the indication from the UE (100) that the UE (100) is in the connected state or using the incorrect BWP/carrier. Further, the MBS controller (210) unicasts the third message to the UE (100) when the UE (100) is in the connected state or using the incorrect BWP/carrier. Further, the MBS controller (110) receives the third message unicasted by the BS (200).

The memory (120) and the memory (220) store instructions to be executed by the processor (130) and the processor (230) respectively. The memory (120, 220) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (120, 220) may, in some examples, be considered a non-transitory storage medium. The term "non-transitory" may indicate that the storage medium is not embodied in a carrier wave or a propagated signal. However, the term "non-transitory" should not be interpreted that the memory (120) is non-movable.

In some examples, the memory (120, 220) can be configured to store larger amounts of information than its storage space. In certain examples, a non-transitory storage medium may store data that can, over time, change (e.g., in Random Access Memory (RAM) or cache). The memory (120) can be an internal storage unit or it can be an external storage unit of the UE (100), a cloud storage, or any other type of external storage. The memory (220) can be an internal storage unit or it can be an external storage unit of the BS (200), the cloud storage, or any other type of external storage. The processor (130) and the processor (230) are configured to execute instructions stored in the memory (120) and the memory (220) respectively.

The processor (130, 230) may be a general-purpose processor, such as a Central Processing Unit (CPU), an Application Processor (AP), or the like, a graphics-only processing unit such as a Graphics Processing Unit (GPU), a Visual Processing Unit (VPU) and the like. The processor (130, 230) may include multiple cores to execute the instructions. The communicator (140) and the communicator (240) are configured for communicating internally between hardware components in the UE (100) and the BS (200) respectively. Further, the communicator (140, 240) is configured to facilitate the communication between the UE (100) and the BS (200) via one or more networks (e.g. Radio technology). The communicator (140, 240) includes an electronic circuit specific to a standard that enables wired or wireless communication.

Although the FIG. 1 shows the hardware components of the UE (100) and the BS (200) but it is to be understood that other embodiments are not limited thereon. In other embodiments, the UE (100) and the B S (200) may include less or more number of components. Further, the labels or names of the components are used only for illustrative purpose and does not limit the scope of the disclosure. One or more components can be combined together to perform same or substantially similar function for managing the control information of the MBS services in the wireless network.

FIG. 2 is a sequential diagram S200 illustrating signaling of the control information of the MBS services between the UE (100) and the BS (200), according to the embodiments as disclosed herein. 201-206 are the sequential steps in the sequential diagram S200. At 201, the BS (200) broadcasts the first message (i.e. SIB 1 message) with scheduling information of the second message (i.e. new MBS SIB message) to the UE (100). Further, the UE (100) receives the first message. At 202, the BS (200) broadcasts the second message with the configuration information includes scheduling information of the third message to the UE (100) based on the scheduling information in the first message, where the second message includes the change notification configuration that allows the UE (100) to periodically check for the change in the MBS services. At 203, the UE (100) receives the second message using a System Information Radio Network Temporary Identifier (SI-RNTI).

At 204, the B S (200) broadcasts the third message (i.e. MCCH message) to the UE (100), where the third message includes the control information of the MBS services. In an embodiment, the BS (200) unicasts the third message to the UE (100) when the UE (100) is in the connected state. At 205, the UE (100) receives the third message using the configuration information in the second message and using the new RNTI (MBS-RNTI). At 206, the UE (100) starts the MBS session by accessing the interested MBS service from the BS (200) using the control information in the third message.

In another embodiment, the new MBS SIB is introduced in order to indicate cell support of the MBS services and to broadcast the list of services supported on serving and neighbor cells to the UE (100). A UE (100) that is interested to receive the MBS service that is supported in the cell, establishes the RRC connection with the BS (200) and requests for the interested service. Upon receiving the request, the serving BS (200) sends the information on scheduling of the supported or interested services to the UE (100) in a unicast manner. This information is sent to the UE (100) either in new Information Elements (IEs) in an RRC reconfiguration message, or as a new message to provide MBS configuration to the UE (100).

FIG. 3 is a sequential diagram S300 illustrating a mixed mode transmission of signaling of the control information of the MBS services between the UE (100) and the BS (200), according to the embodiments as disclosed herein. 301-307 are the sequential steps in the sequential diagram S300. At 301, the BS (200) broadcasts the first message (i.e. SIB 1 message) with scheduling information of the second message (i.e. new MBS SIB message) to the UE (100). Further, the UE (100) receives the first message. At 302, the BS (200) broadcasts the second message with the configuration information includes scheduling information of the third message to the UE (100) based on the scheduling information in the first message, where the second message includes the change notification configuration that allows the UE (100) to periodically check for the change in the MBS services. Further, the UE (100) receives the second message. At 303, the BS (200) broadcasts the third message (i.e. MCCH message) to the UE (100), where the third message includes the control information for accessing the specific set of MBS services.

At 304, the UE (100) is interested to access any MBS service. At 305, the UE (100) establishes the RRC connection with the BS (200) and requests for the list of services that are available on the cell, in response to receiving the third message. At 306, the BS (200) sends the fourth message includes MBS control information includes the list of services support on the cell, and the list of services supported on the neighbor cell, the list of services supported on the serving cell, and the list of neighbor cells that support the same service. In another embodiment, the BS (200) may signal the service configuration either along with the service list (scheduling for all supported service is sent in this case) or upon receiving interest indication from the UE (100) (only the scheduling information of the interested service is signaled in this case). Further, the UE (100) sends the request for accessing the remaining set of MBS services to the BS (200) based on the service configuration Further, the BS (200) providing the remaining set of MBS services to the UE (100). At 307, the UE (100) starts the MBS session by accessing the interested service from the BS (200).

In an embodiment, the BS (200) sends the service list to UE (100) either in the new IEs in the RRC reconfiguration message or as a new message to provide the MBS configuration. In an embodiment, the B S (200) configures the UE (100) interested in receiving the MBS services to send a service list query using a UE information request or providing the UE (100) with configuration for the UE assistance information. In another embodiment, the UE (100) sends the service list query to the serving cell via the UE information message, or UE assistance information, or via (Medium Access Control-Control Element) MAC-CE. In another embodiment, the serving cell provides the scheduling configuration of interested MBS service to the UE (100) via the new IEs in the RRC reconfiguration message or as part of other configurations as illustrated in the FIG. 3.

FIG. 4 is a sequential diagram S400 illustrating the mixed mode transmission of signaling of the control information of the specific set of MBS services and the remaining set of MBS services between the UE (100) and the B S (200), according to the embodiments as disclosed herein. 401-408 are the sequential steps in the sequential diagram S400. At 401, the BS (200) broadcasts the first message (i.e. SIB 1 message) with scheduling information of the second message (i.e. new MBS SIB message) to the UE (100). Further, the UE (100) receives the first message. At 402, the BS (200) broadcasts the second message with the configuration information includes scheduling information of the third message to the UE (100) based on the scheduling information in the first message, where the second message includes the change notification configuration that allows the UE (100) to periodically check for the change in the MBS services. The change notification configuration includes the new RNTI to decode the downlink control information over PDCCH for the MCCH change notification message. The MCCH change notification is a string of bits where each bit indicates a particular indication such as a start of a new session, a stop of a session, a change of a session or related configuration and so on. Further, the UE (100) receives the second message. At 403, the BS (200) broadcasts the third message (i.e. MCCH message) to the UE (100), where the third message includes the control information for accessing the specific set of MBS services. There can be limited configurations for the service that are available in connected state. If the UE (100) is interested to access any MBS service supported on the cell, then the UE (100) indicates the interest in that service to the BS (200). For this purpose of sending interest indication, an UE in Idle and/or Inactive state, will trigger an RRC connection establishment and/or resumption.

In an embodiment, the UE (100) indicates its interest in receiving the service, via the RRC signaling which indicates a session ID if the service that the UE (100) is interested to receive. In another embodiment, the UE (100) indicates the interest in receiving the MBS service by using the MAC CE which indicates an index of the service that UE (100) is interested to receive. Upon receiving the interest indication from the UE (100), the BS (200) signals the information on scheduling of the supported or interested services to the UE (100) in a unicast manner. This information is sent to the UE (100) either using the new IEs in the RRC reconfiguration message, or as the new message to provide MBS configuration. At 404, the UE (100) establishes the RRC connection with the B S (200) and requests for the list of services that are available on the cell, in response to receiving the third message. At 405, the BS (200) sends the RRC reconfiguration includes the configuration for the UE (100) to request additional MBS control information and/or the configuration for the interest indication to the UE (100). At 406, the UE (100) sends the request using the RRC signaling or MAC signaling for accessing the remaining set of MBS services to the BS (200) based on the service configuration. At 407, the BS (200) provides the additional MBS control information and/or the configuration to the UE, which allows the UE (100) to access the remaining set of MBS services. At 408, the UE (100) starts the MBS session by accessing the interested service from the BS (200) using the MBS control information.

Unlike to the existing methods and systems, the proposed method has a benefit of having a lean broadcast signaling (i.e. receiving by the UE (100) the configuration information in the unicast signaling at which the broadcast contents are reduced or not required for these services), easy provision of handling change in multicast information. However, the UE (100) is aware of the MBS scheduling only upon entering the RRC connected state. Therefore, the RRC idle/inactive state of the UE (100) needs to first establish the connection in order to start the MBS session which increases a unicast signaling overhead as each UE (100) needs to be signaled separately. In an embodiment, the UE (100) in the RRC idle/inactive state needs to establish the RRC connection in order to receive the MBS configuration or/and the MBS service.

FIG. 5 is a sequential diagram S500 illustrating a broadcast transmission of signaling of the control information of the MBS services between the UE (100) and the BS (200), according to the embodiments as disclosed herein. 501-504 are the sequential steps in the sequential diagram S500. At 501, the BS (200) broadcasts the first message (i.e. SIB 1 message) with the scheduling information of the second message (i.e. new MBS SIB message) to the UE (100). Further, the UE (100) receives the first message. At 502, the BS (200) broadcasts the second message to the UE (100) based on the scheduling information in the first message, where the second message includes the complete control information of the MBS services. The new MBS SIB message signals the list of services (on serving and optionally neighbor cells) and the scheduling information for all the supported services i.e. SIB+new message of broadcast hierarchical method is encapsulated into a single message. In an embodiment, the new MBS SIB message is introduced for signaling cell support of the MBS, the list of services supported on the serving and neighbor cells, the list of neighbor cells that support the service that is supported on the current cell, the scheduling information for the supported service. The same signaling can be used for UE (100) in any RRC state.

At 503, the UE (100) receives the second message based on the scheduling information in the first message and using the SI-RNTI. Generally, a change in the SIB message is indicated using a change in value tag. This can be very exhaustive, and an alternate mechanism to use physical layer signaling to indicate that the MBS information has changed. This can be done using a physical layer change notification or Downlink Control Information (DCI) which specifically indicates that the MBS information has changed. But the present/occurrence of the new MBS SIB message is not changed i.e. the existing SIB scheduling information remains valid. The UE (100) on receiving this change notification attempts to read the new MBS SIB message in order to update the stored information, without the need to read the SIB1 message and value tag again. In an embodiment, the change in the new MBS SIB message is indicated using the physical layer change notification or DCI. In another embodiment, the UE (100) directly reads the new MBS SIB message upon receiving the change notification, without having to read the SIB1 message again. At 504, the UE (100) starts the MBS session by accessing the interested service from the BS (200) using the control information in the second message.

FIG. 6 is a sequential S600 diagram illustrating the broadcast transmission of signaling of the control information of the MBS services between the UE (100) and the B S (200) for a sub-cell level support of MBS, according to the embodiments as disclosed herein. In an embodiment, the BS (200) deploys the MBS services only in a subset of an entire carrier bandwidth i.e. in a few BWPs only. In this case, it is required for the BS (200) to indicate the BWP where the MBS services are supported. A UE (100) interested in the MBS services will switch to one of the MBS BWPs (i.e. initial MBS BWP) that is broadcast in the SIB message, while other UEs remain on the original initial BWP. The MBS BWP may support either only the MBS services or both MBS and unicast services and this can be signaled in the SIB message as well. The MBS BWP may or may not have a Synchronization Signal Block (SSB) scheduled over them. If the SSB is not scheduled over the MBS BWP, then the broadcast information (based on earlier methods using MBS SIB, using MBS control information, or using existing SIB—say SIB1) also provides the random access parameters.

601-606 are the sequential steps in the sequential diagram S600. In this embodiment, the UE (100) is using the initial BWP at 601. At 602, the BS (200) broadcasts the first message (i.e. SIB 1 message or new SIB message) to the UE (100), where the first message includes the MBS service support indication of the cell, the list of BWPs supporting the MBS services, and the list of the MBS services associated to each BWPs. In an embodiment, the MBS services are supported only on some BWPs and not the entire carrier frequency. In another embodiment, the initial MBS BWP is introduced when the UE (100) is in the RRC idle state or the RRC inactive state can tune a radio frequency of the UE (100) to receive the MBS control information and MBS traffic packets. At 603, the UE (100) selects the BWPs supporting the interested MBS service based on the first message. In an embodiment, the UE (100) determines whether the initial BWP is equal or larger than the BWP required for accessing the MBS services. The UE (100) selects the BWP from the list of BWPs equal or larger than the BWP required for accessing the MBS services when the initial BWP is not equal or larger than the BWP required for accessing the MBS services. The UE (100) selects the initial BWP for accessing the MBS services when the initial BWP is equal or larger than the BWP required for accessing the MBS services.

At 604, the BS (200) broadcasts the second message (i.e. the new MBS SIB message) includes the complete control information of the MBS services to the plurality of UEs (100A) through the BWPs supporting the MBS services. At 605, the UE (100) receives the second message from the BS (200) through the selected BWPs using the new RNTI (MBS-RNTI). At 606, the UE (100) starts the MBS session by accessing the interested service from the BS (200) through the selected BWPs and using the control information. The new MBS SIB message or the existing SIB message (i.e. SIB1 message) indicates the presence of the MBS in the list of BWPs and the configuration to read MBS configuration message if it is broadcast in the MBS BWP (i.e. MBS configuration information is BWP specific and not cell specific). The SIB message further indicates if the MBS BWP(s) support unicast services in addition to the MBS or not. The SIB may further signal Random Access Channel (RACH) parameters for the MBS BWP in case the SSB is not available on the MBS BWP, and also when a unicast method of the multicast information signaling is used. When a broadcast method of the multicast configuration signaling is used, then the RACH parameters may be provided as part of the multicast configuration itself.

In an embodiment, the SIB indicates if the BS (200) supports cell specific MBS or BWP specific support. It is also possible that the services supported on each BWP are not the same (considering that each BWP may be on different numerology). Also, the SIB also includes the services supported on each MBS BWP. In another embodiment, the SIB signals the BWP(s) on which MBS services are supported, and also the services supported on each BWP. In an embodiment, the wireless network is deployed to support the MBS services only on its SCells and not on a PCell. An indicator in the SIB can indicate if the current cell does not support the MBS but an available (i.e. configurable) SCell supports the MBS (considering that network operator can configure some cells only for use as the SCells and can never be used as the PCells. Therefore, the UE (100) can establish the connection on this PCells/BWP and get appropriate SCells configured upon entering RRC connected state, in order to avail MBS services. In an embodiment, the MBS services are supported only on the SCells and the UE (100) in the RRC connected state is informed of the MBS control information using the new IEs in the RRC reconfiguration message or the new RRC message. In another embodiment, the SIB 1 message is followed by a new MBS SIB message which carries the configuration for the MCCH. Further, another "new SIB message" (different than MBS SIB) is introduced which carries the frequencies and MBS services mapping which is available on the neighboring cells/frequencies (in short, frequency-service mapping info). This "new SIB message" can also be broadcasted by the BS (200) on a cell which is not supporting MBS transmission (i.e. non-MBS cell). Therefore, the UE (100) on the non-MBS cell knows about frequency-service mapping info for MBS services and reselects a correct frequency/cell to receive the interested MBS services.

FIG. 7 is a sequential diagram S700 illustrating the mixed mode transmission of signaling of the control information of the MBS services between the UE (100) and the BS (200) for sub-cell level support of the MBS or SCell support of the MBS, according to the embodiments as disclosed herein. In an embodiment, the wireless network is deployed to support the MBS services only on its SCells and not on the primary cell. The indicator in SIB indicates if the current cell does not support MBS but an available (configurable) SCell supports the MBS (considering that operator can configure some cells only for use as SCells and can never be used as PCells). The same or different indicator informs the UE (100) of support of the MBS services on its configurable SCells. In an embodiment, the MBS services are supported only on the SCells and the UE (100) in the RRC connected state is informed of the MBS control information using the new IEs in the RRC reconfiguration message or the new RRC message.

701-707 are the sequential steps in the sequential diagram S700. In this embodiment, the UE (100) is using the initial BWP at 701. At 702, the BS (200) broadcasts the first message (i.e. SIB 1 message or new SIB message) to the UE (100), where the first message includes the MBS service support indication of a cell, the list of BWPs supporting the MBS services, and the list of the MBS services associated to each BWPs. At 703, the UE (100) selects the BWPs supporting the interested MBS service based on the first message. In an embodiment, the UE (100) determines whether the initial BWP is equal or larger than the BWP required for accessing the MBS services. The UE (100) selects the BWP from the list of BWPs equal or larger than the BWP required for accessing the MBS services, when the initial BWP is not equal or larger than the BWP required for accessing the MBS services. The UE (100) selects the initial BWP for accessing the MBS services, when the initial BWP is equal or larger than the BWP required for accessing the MBS services. At 704, the UE (100) establishes the RRC connection with the BS (200). At 705, the BS (200) unicasts the control information of the MBS services to the UE (100). At 706, the UE (100) receives the control information of the MBS services using the C-RNTI. At 707, the UE (100) sends the request for the interested MBS service and/or the specific BWP in the selected BWPs. At 708, the BS (200) switches the current BWP of the UE (100) to the specific BWP, in response to receiving the request from the UE (100). At 709, the UE (100) starts the MBS session by accessing the interested service from the BS (200) through the specific BWP and using the control information.

Unlike to a sub cell level support of the MBS, the proposed method uses the BWP based MBS support for broadcasting signaling of the MBS control information. In this proposed method, the existing SIB indicates if the cell supports the MBS service, but does not signal the control information to access the MBS services. The indication is sent over the new SIB message alike the MBS SIB in previous embodiments. In an embodiment, a new indicator in the SIB signals the support of the BWP based MBS on the cell.

All other multicast configuration is provided as part of the unicast signaling. In addition to the MBS services (based on what information is broadcast already) and the unicast signaling includes the BWP specific configuration includes the MBS supported BWPs, the services supported in each BWP, the scheduling information for the supported services. In another embodiment, the scheduling information is sent to the UE (100) only upon receiving the interest indication from the UE (100) for the specific MBS service. In an embodiment, all these configurations are signaled to UE (100) as the new IEs in the RRC reconfiguration message, or as the new RRC message. In another embodiment, the BWP specific MBS support and optionally the scheduling information is added as part of the existing connected state BWP configuration.

Similar to switching of SI between broadcast and on-demand, the message carrying MBMS configuration can also be switched between broadcast, on-demand or unicast. Based on the number of the MBS capable or the MBS interested UEs in the cell, the BS (200) switches between the broadcast signaling and the unicast signaling of the MBS configuration and/or the MBS control information.

The various actions, acts, blocks, steps, or the like in the sequential diagrams S200, S300, S400, S500, S600, S700 may be performed in the order presented, in a different order or simultaneously. Further, in some embodiments, some of the actions, acts, blocks, steps, or the like may be omitted, added, modified, skipped, or the like without departing from the scope of the disclosure.

In the proposed method all information required to access a multicast service is signaled in multiple broadcast messages. The reason for having different messages is that a scheduling frequency of a SIB and a new broadcast message (i.e. MCCH or new MBS SIB) carrying the MBS control information may be different i.e. a new broadcast message may be read at larger periodicity. Content of the new broadcast message may change more frequently due to addition/removal of services or a change in scheduling of these services. A change in the new broadcast message does not impact a new SIB and hence no UE procedure due to System Information (SI) change based on value tag is required. This approach has benefits in that it uses common signaling for the UE (100) in all RRC states. The UE (100) does not have to enter an RRC connected state to retrieve any information about the MBS services and can start service reception directly in the RRC idle state or the RRC inactive state, which provides a simpler procedure for service continuity during reselection. The SIB includes only information related to scheduling of the new broadcast message.

The new broadcast message includes the list of services available in a cell, the list of services that are available in both serving and its neighbor cells, the list of additional services that are available in specific neighbour cells, and the scheduling information (e.g. DRX scheduling configurations) for services supported in the current cell (including G-RNTI for each service). The UE (100) decodes the new broadcast message either using the SI-RNTI or the new RNTI (i.e. MBS-RNTI). In an embodiment, the neighbor cell support of the MBS service that is active/supported on the current serving cell is signalled as part of an RRC message carrying the MBS control information. In another embodiment, the MBS control information may include the list if supported services on the neighbor cells. In another embodiment, the new RNTI is introduced in order to receive the MBS control information.

This new message may utilize principle of on-demand SI messages. To reduce a number of times/frequency the UE (100) reads this broadcast message, a periodicity when a change in MBS services can occur is also configured. This may be modification period based or direct periodicity. So, the UE (100) which has already received the MBS configuration only reads this message again at the listed periodicity, or upon a change in interested service.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein

The invention claimed is:

1. A method performed by a terminal in a wireless communication system, the method comprising:
   receiving, from a base station, a system information block including configuration information on a control message for multicast broadcast service (MBS);
   receiving, from the base station, the control message based on the configuration information and a specific radio network temporary identifier (RNTI) for the MBS, the control message including control information on the MBS; and
   receiving, from the base station, data associated with the MBS based on the control information,
   wherein a modification period associated with the control message is configured for the MBS, and
   wherein, in case that the MBS is served on a secondary cell (SCell), the MBS is not served on a primary cell (PCell).

2. The method of claim 1, further comprising:
   establishing a radio resource control (RRC) connection; and
   receiving, from the base station, an RRC reconfiguration message including information on the MBS based on the RRC connection.

3. The method of claim 1,
   wherein a bandwidth part (BWP) associated with the MBS is configured based on the system information block,
   wherein the BWP is defined for receiving the control information on the MBS, and
   wherein the MBS is supported on some BWPs of an entire bandwidth of the base station.

4. The method of claim 1, wherein control information on the MBS for the SCell is informed based on an RRC reconfiguration message, and wherein a broadcast signaling of MBS control information and a unicast signaling of MBS control information is switched based on a number of UEs in a cell.

5. A method performed by a base station in a wireless communication system, the method comprising:

transmitting a system information block including configuration information on a control message for multicast broadcast service (MBS);

transmitting the control message based on the configuration information and a specific radio network temporary identifier (RNTI) for the MBS, the control message including control information on the MBS; and transmitting data associated with the MBS based on the control information, wherein a modification period associated with the control message is configured for the MBS, and wherein, in case that the MBS is served on a secondary cell (SCell), the MBS is not served on a primary cell (PCell).

6. The method of claim 5, wherein a radio resource control (RRC) connection is established for a terminal, and wherein an RRC reconfiguration message including information on the MBS based on the RRC connection is transmitted to the terminal.

7. The method of claim 5, wherein a bandwidth part (BWP) associated with the MBS is configured based on the system information block, wherein the BWP is defined for receiving the control information on the MBS, and wherein the MBS is supported on some BWPs of an entire bandwidth of the base station.

8. The method of claim 5, wherein control information on the MBS for the SCell is informed based on an RRC reconfiguration message, and wherein a broadcast signaling of MBS control information and a unicast signaling of MBS control information is switched based on a number of UEs in a cell.

9. A terminal in a wireless communication system, the terminal comprising:

a transceiver; and a controller configured to:

receive, from a base station via the transceiver, a system information block including configuration information on a control message for multicast broadcast service (MBS), receive, from the base station via the transceiver, the control message based on the configuration information and a specific radio network temporary identifier (RNTI) for the MBS, the control message including control information on the MBS, and receive, from the base station via the transceiver, data associated with the MBS based on the control information, wherein a modification period associated with the control message is configured for the MBS, and wherein, in case that the MBS is served on a secondary cell (SCell), the MBS is not served on a primary cell (PCell).

10. The terminal of claim 9, wherein the controller is further configured to:

establish a radio resource control (RRC) connection, and receive, from the base station via the transceiver, an RRC reconfiguration message including information on the MBS based on the RRC connection.

11. The terminal of claim 9, wherein a bandwidth part (BWP) associated with the MBS is configured based on the system information block, wherein the BWP is defined for receiving the control information on the MBS, and wherein the MBS is supported on some BWPs of an entire bandwidth of the base station.

12. The terminal of claim 9, wherein control information on the MBS for the SCell is informed based on an RRC reconfiguration message, and wherein a broadcast signaling of MBS control information and a unicast signaling of MBS control information is switched based on a number of UEs in a cell.

13. A base station in a wireless communication system, the base station comprising:

a transceiver; and a controller configured to:

transmit, via the transceiver, a system information block including configuration information on a control message for multicast broadcast service (MBS), broadcast, via the transceiver, the control message based on the configuration information and a specific radio network temporary identifier (RNTI) for the MBS, the control message including control information on the MBS, and broadcast, via the transceiver, data associated with the MBS based on the control information, wherein a modification period associated with the control message is configured for the MBS, and wherein, in case that the MBS is served on a secondary cell (SCell), the MBS is not served on a primary cell (PCell).

14. The base station of claim 13, wherein a radio resource control (RRC) connection is established for a terminal, and wherein an RRC reconfiguration message including information on the MBS based on the RRC connection is transmitted to the terminal.

15. The base station of claim 13, wherein a bandwidth part (BWP) associated with the MBS is configured based on the system information block, wherein the BWP is defined for receiving the control information on the MBS, and wherein the MBS is supported on some BWPs of an entire bandwidth of the base station.

16. The base station of claim 13, wherein control information on the MBS for the SCell is informed based on an RRC reconfiguration message, and wherein a broadcast signaling of MBS control information and a unicast signaling of MBS control information is switched based on a number of UEs in a cell.

* * * * *